US009805233B2

(12) United States Patent
Sample et al.

(10) Patent No.: US 9,805,233 B2
(45) Date of Patent: Oct. 31, 2017

(54) SYSTEMS AND METHODS FOR FOLLOWING DISTINGUISHING MEMBERS USING TAGS IN COMBINATION WITH A LOCALIZING DEVICE

(71) Applicant: Disney Enterprises, Inc., Burbank, CA (US)

(72) Inventors: Alanson Sample, Pittsburgh, PA (US); Hanchuan Li, Seattle, WA (US); Samer Al Moubayed, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/150,319

(22) Filed: May 9, 2016

(65) Prior Publication Data
US 2017/0200032 A1    Jul. 13, 2017

Related U.S. Application Data

(60) Provisional application No. 62/276,608, filed on Jan. 8, 2016.

(51) Int. Cl.
*G06K 7/10* (2006.01)
*G06F 17/30* (2006.01)
*H04N 21/4223* (2011.01)

(52) U.S. Cl.
CPC .... *G06K 7/10366* (2013.01); *G06F 17/30811* (2013.01); *G06K 7/10316* (2013.01); *H04N 21/4223* (2013.01)

(58) Field of Classification Search
CPC .......... G06K 7/10366; G06K 7/10316; H04N 21/4223; G06F 17/30811
See application file for complete search history.

(56) References Cited

U.S. PATENT DOCUMENTS

| | | | | |
|---|---|---|---|---|
| 7,076,441 | B2* | 7/2006 | Hind | G06Q 10/087 705/7.29 |
| 2005/0270158 | A1* | 12/2005 | Corbett, Jr. | G08B 21/0261 340/572.1 |
| 2007/0241965 | A1* | 10/2007 | Kolavennu | G01S 7/003 342/465 |
| 2009/0072029 | A1* | 3/2009 | Martin | G06Q 10/087 235/385 |

(Continued)

OTHER PUBLICATIONS

"EPML: Expanded Parts based Metric Learning for Occlusion Robust Face Verification" by: Sharma et al., 2015, pp. 1-15.

(Continued)

*Primary Examiner* — Thomas Alunkal
(74) *Attorney, Agent, or Firm* — Farjami & Farjami LLP

(57) ABSTRACT

There is provided a system including a plurality of radio frequency (RF) tags, each corresponding to one of a plurality of individuals, a memory, and a processor configured to receive a signal from a first RF tag of the plurality of RF tags, the signal including a first tag identification (ID) uniquely identifying the first RF tag, follow a motion of the first RF tag, follow a motion of a first individual of the plurality of individuals, and determine a first likelihood that the first RF tag corresponds to the first individual based on the motion of the first RF tag and the motion of the first individual.

20 Claims, 6 Drawing Sheets

(56) References Cited

U.S. PATENT DOCUMENTS

| | | | |
|---|---|---|---|
| 2012/0169500 A1* | 7/2012 | Stern | G08B 13/2402 |
| | | | 340/572.1 |
| 2013/0249736 A1* | 9/2013 | Nikitin | G01S 5/02 |
| | | | 342/450 |
| 2014/0002663 A1* | 1/2014 | Garland | H04N 7/188 |
| | | | 348/159 |
| 2014/0167920 A1* | 6/2014 | Kamiya | G01S 13/58 |
| | | | 340/10.1 |
| 2015/0019161 A1* | 1/2015 | Moriguchi | G07C 9/00 |
| | | | 702/150 |
| 2016/0328638 A1 | 11/2016 | Elsaid Ibrahim | |
| 2016/0379074 A1* | 12/2016 | Nielsen | G06K 9/3241 |
| | | | 348/143 |

OTHER PUBLICATIONS

"Person Re-identification with Correspondence Structure Learning" by: Shen et al., 2015 IEEE, pp. 1-9.
"Object Detection with Discriminatively Trained Part Based Models" by: Felzenszwalb et al., Sep. 2010, pp. 1-20.
"Large Scale Metric Learning from Equivalence Constraints" by: Kostinger et al., Jun. 2012, pp. 1-8.
"Person Re-identification via Learning Visual Similarity on Corresponding Patch Pairs" by: Sheng et al., 2015, pp. 787-798.

\* cited by examiner

SYSTEMS AND METHODS FOR FOLLOWING DISTINGUISHING MEMBERS USING TAGS IN COMBINATION WITH A LOCALIZING DEVICE

RELATED APPLICATION(S)

The present application claims the benefit of and priority to U.S. Provisional Patent Application Ser. No. 62/276,608, filed Jan. 8, 2016, which is hereby incorporated by reference in its entirety into the present application.

BACKGROUND

Conventional methods for distinguishing individual characteristics in a group typically use a camera and facial recognition software. Conventional image-based methods suffer because many images are not taken with a sufficiently high resolution for use by the facial recognition software. Further, face recognition typically requires a tedious registration process involving taking a large number of pictures for each user, and does not function accurately due to variations in user's face orientation, lighting conditions or occlusions caused by nearby users or objects. Other conventional methods involve locating individuals using radio frequency (RF) devices, but because such devices utilize signals having a long wavelength, such devices cannot sufficiently localize the signals so as to distinguish members within a group.

SUMMARY

The present disclosure is directed to systems and methods for following distinguishing members in a group using tags in combination with visual observation, substantially as shown in and/or described in connection with at least one of the figures, as set forth more completely in the claims.

DETAILED DESCRIPTION

Figure 1:
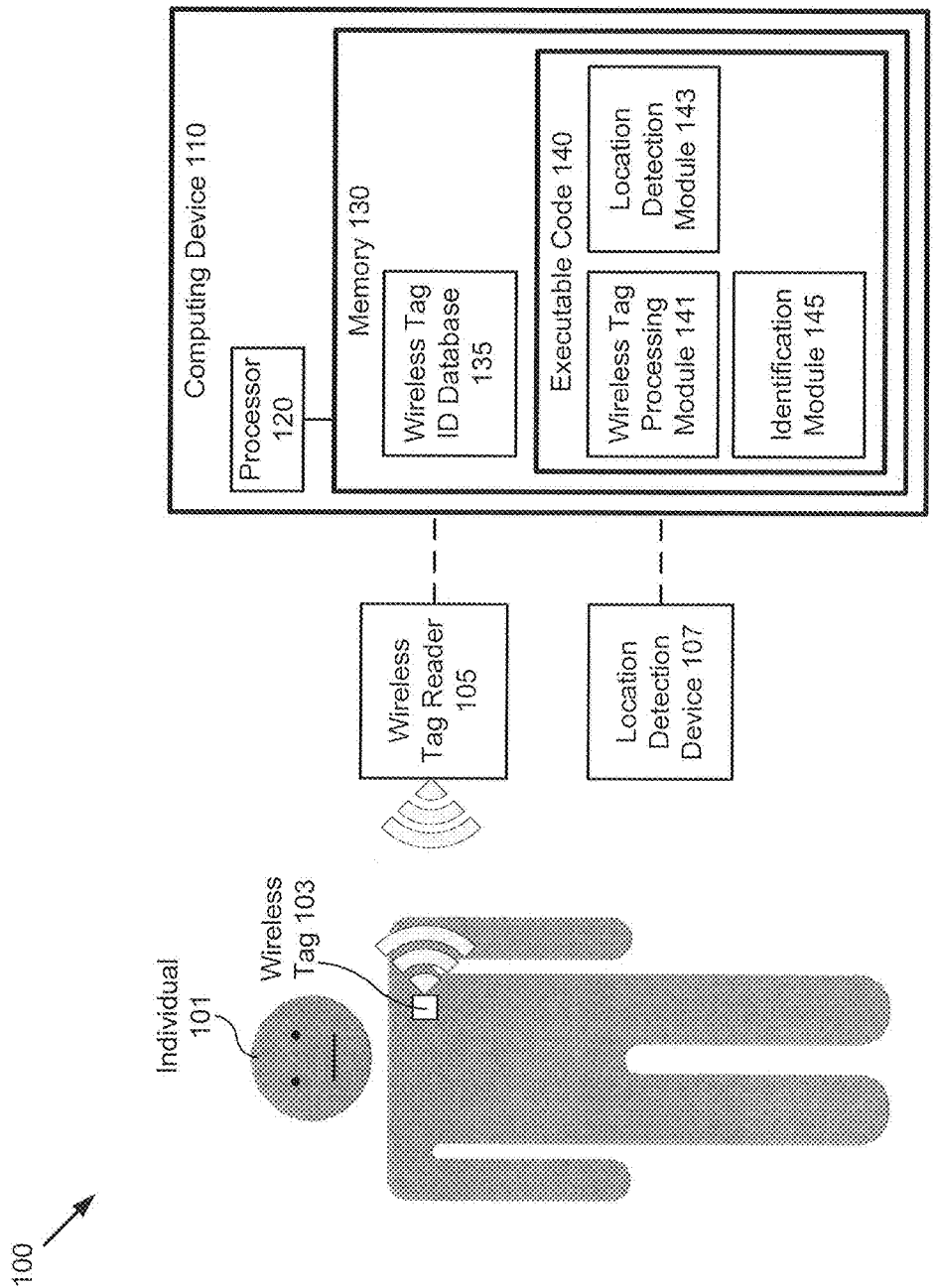
FIG. 1 shows a diagram of an exemplary system for distinguishing members in a group using tags, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for distinguishing members in a group using tags, according to one implementation of the present disclosure. System 100 includes wireless tag 103 worn by individual 101, wireless tag reader 105, location detection device 107, and computing device 110. Computing device 110 includes processor 120 and memory 130. Processor 120 is a hardware processor, such as a central processing unit (CPU) used in computing devices. Memory 130 is a non-transitory storage device for storing computer code for execution by processor 120, and also storing various data and parameters. Memory 130 includes wireless tag identification (ID) database 135 and executable code 140.

Wireless tag 103 includes electronic circuitry that is packaged and contains electronically stored information. Wireless tag 103 may be attached to, or worn by, and the electronically stored information in wireless tag 103 may distinguish the individual 101 from other nearby individuals (not shown in FIG. 1). For example, wireless tag 103 may be included in a wearable nametag, such as a clip-on name tag or a nametag worn on a lanyard, or wireless tag 103 may be included in a bracelet, wristband, handheld device, etc. Wireless tag 103 may be an active wireless tag, a battery-assisted passive wireless tag, or a passive wireless tag. In some implementations, wireless tag 103 may be a radio frequency identification (RFID) tag, an ultra high frequency (UHF) RFID tag, or a short distance radio transmitter. Short distance radio transmissions may operate in the unlicensed industrial, scientific and medical (ISM) band at 2.4-2.485 GHz using a spread spectrum, frequency hopping, full-duplex signal at a nominal rate of 1600 hops/sec. In some implementations, wireless tag 103 may include a short range radio frequency transmitter, such as a BLUETOOTH® (BT) transmitter. BLUETOOTH® is a registered trademark owned by Bluetooth SIG, Inc. Wireless tag 103 may include a unique tag identification (ID) that may be transmitted to or read by wireless tag reader 105. In other implementations, wireless tag 103 may be an optical tag having unique patterns, which can be read or captured using wireless tag reader 105, such as an infrared camera, and be used to uniquely identify individual 101.

Wireless tag reader 105 may be a wireless device having a wireless receiver coupled to an antenna for reading or obtaining information from wireless tags, such as an RFID reader. RFID readers include a radio frequency transceiver, which is able to read RFID tags, and may also be able to provide information for storing in RFID tags. In some implementations, wireless tag reader 105 may read passive or active RFID tags. Wireless tag reader 105 may transmit interrogator signals and receive authentication replies from wireless tag 103. Wireless tag reader 105 may be used to monitor and/or follow a plurality of wireless tags in a room, building, or any other environment, such as an area near an attraction at a theme park, and may communicate with each wireless tag via a communication channel corresponding to each wireless tag. Each communication channel may have its own particular characteristics and impairments. In some implementations, wireless tag reader 105 may detect wireless channel parameters, such as Received Signal Strength Indicator (RSSI), RF phase, and Doppler shift of the communication channel used by wireless tag 103.

Location detection device 107 may be a device for locating one or more of a plurality of individuals. In some implementations, location detection device 107 using recognition based on computer vision may include a stereo or 3D depth camera for taking videos and/or still images, a LIDAR (light detection and ranging) device, or a structured light or other devices suitable for detecting, determining, and/or following the location of each individual in a group of individuals. Following the location includes both following in real time as well as following and recording location over time to create a path or track. For example, location determination device 107 may include a camera for capturing a three-dimensional (3D) video of the area in front of location device 107, such as a KINECT™, REALSENSE™ or similar device. KINECT™ is a trademark of the Microsoft Corporation and REALSENSE™ is a trademark of Intel Corporation in the United States and other countries.

Wireless tag ID database 135 is a database stored in memory 130, and may include a plurality of wireless tag IDs, each corresponding to a wireless tag, such as wireless tag 103. In some implementations, each wireless tag ID in wireless tag ID database 135 may be associated with a unique wireless tag, such as wireless tag 103. One or more of the wireless tag IDs in wireless tag ID database 135 may be associated with characteristic information describing a particular individual 101 wearing wireless tag 103 such as a name, a nickname, an image, avatar, or other information that may be selected by individual 101 for inclusion in database 135. For example, a guest at a theme park may register and receive a name badge including wireless tag 103, and the characteristic information of the guest may be entered into wireless tag ID database 135 and be associated with the wireless tag ID of wireless tag 103.

Executable code 140 includes one or more software modules stored in memory 130 for execution by processor 120 of computing device 110. As shown in FIG. 1, executable code 140 includes wireless tag processing module 141, location detection module 143, and identification module 145. Wireless tag processing software 141 is a software module stored in memory 130 for execution by processor 120 to receive and process information received from wireless tag reader 105. In some implementations, wireless tag processing software 141 may be a real-time data acquisition and classification program. For example, wireless tag processing software 141 may observe changes in the physical layer signals of the communication channel between an RFID reader and wireless tag 103, such as an RSSI, an RF phase, and a Doppler shift of the communication channel between an RFID reader and wireless tag 103. The physical layer refers the first layer of the Open System Interconnection Model (OSI Model). The physical layer defines the means of transmitting raw bits between wireless tag 103 and wireless tag reader 105. Wireless tag processing software 141 may use changes in the physical layer signals of the communication channel between the RFID reader and wireless tag 103 to determine changes in a position and/or location of individual 101 possessing wireless tag 103.

Location detection module 143 is a software module stored in memory 130 for execution by processor 120 to detect, determine, and/or follow the location of each individual in a group of individuals. In some implementations, location detection module 143 may receive a signal from location detection device 107 and detect, determine, and/or follow the location of individual 101 based on the signal.

Identification module 145 is a software module stored in memory 130 for execution by processor 120 to identify each individual in a group. Identification module 145 may receive wireless tag processing data from wireless tag processing module 141 and/or location information from location detection module 143. In some implementations, identification module 145 may compare the wireless tag ID of wireless tag 103 with tag IDs in wireless tag ID database 135, and if identification module 145 finds a match in wireless tag ID database 135, identification module 145 may associate the wireless tag ID with information stored in wireless tag ID database 135, such as the characteristic information provided by individual 101.

Figure 2:
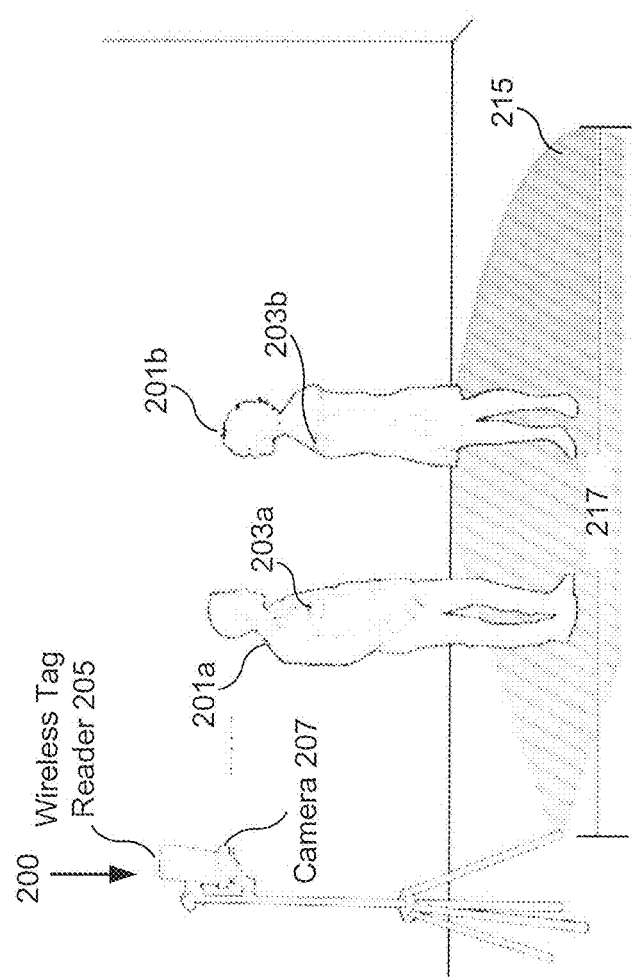
FIG. 2 shows a diagram of an exemplary environment including the system of FIG. 1, according to one implementation of the present disclosure.

FIG. 2 shows a diagram of an exemplary environment including the system of FIG. 1, according to one implementation of the present disclosure. FIG. 2 shows system 200 including wireless tag reader 205, camera 207, and view area 215. Wireless tag reader 205 may be a UHF RFID reader with a single antenna, and camera 207 may be a 3D camera, such as a depth camera. As shown in FIG. 2, individual 201*a* and individual 201*b* wear wireless tag 203*a* and wireless tag 203*b*, respectively. View area 215 may be the area from which wireless tag reader 205 may receive signals from wireless tags 203*a* and 203*b*, and may have range 217. In some implementations, system 200 may include a plurality of wireless tag readers, such that view area 215 may cover a 360° field around system 200. In some implementations, wireless tags 203*a* and 203*b* may include UHF RFID tags, which may be included in a name badge, wristband, etc. As individuals, such as individual 201*a* and individual 201*b*, enter view area 215, wireless tag reader 205 may continuously read wireless tag 203*a* and wireless tag 203*b*, and camera 207 may follow the 3D position of each individual 201*a* and individual 201*b* in view area 215.

Figure 3:
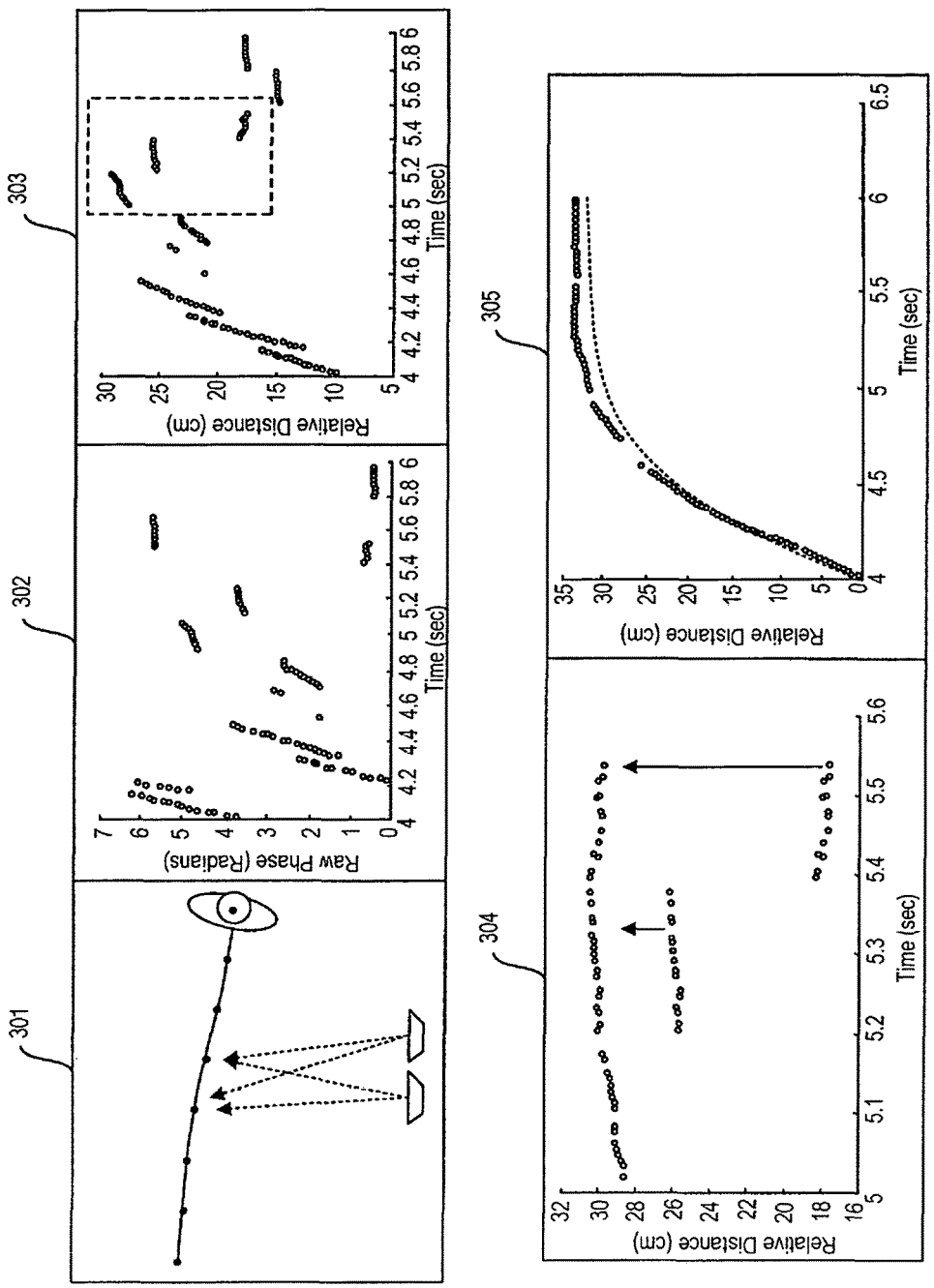
FIG. 3 shows a diagram of an exemplary data collection for distinguishing members in a group using tags, according to one implementation of the present disclosure.

FIG. 3 shows a diagram of an exemplary data collection for distinguishing members in a group using tags, according to one implementation of the present disclosure. Panel 301 shows a basic paradigm of synthetic aperture radar (SAR), showing the path of one individual with the estimated location of the individual. In some implementations, system 100 of FIG. 1 may be configured such that wireless tag reader 105 is placed in a fixed location, where the motion of wireless tag 103, when worn by an individual in motion, creates a synthetic aperture. Since the exact trajectory of individual 101 is not known, i.e. individual 101 is free-roaming, executable code 140 may not be able to directly compute the exact location of wireless tag 101.

A key attribute of a passive RFID system is that the RFID tags do not actively generate and transmit radio waves. Instead, RFID tags back-scatter the carrier wave transmitted by wireless tag reader 105 back to wireless tag reader 105 in order to send data. This unique feature of the UHF RFID physical layer means that during a single read event, wireless tag reader 105 may precisely measure the phase angle between the signal transmitted by wireless tag reader 105 and the reflected signal received from wireless tag 103. Panel 302 shows a data plot of a two-second snap shot of the raw phase measurement as a function of time for individual 101 wearing wireless tag 103 and walking towards wireless tag reader 105. The discontinuities in the reported phase are partially due to $2\pi$ radian wrapping as can be seen at 4.2 seconds. An additional source of error may be due to an unknown phase offset introduced when the reader pseudo-random frequency hops from one carrier to another as required by regulations. This manifests in panel 302 as a grouping in the phase data, where each group consists of a series of data points read consecutively at the same frequency. In some implementations, executable code 140 may calculate the relative radial distance D from the tag to the reader, where φ is the phase angle reported by wireless tag reader 105, f is the frequency of the RF carrier, and c is the speed of light.

$$D = \frac{\phi c}{-4\pi f}; 0 < \phi < 2\pi \quad (1)$$

Panel 303 shows the phase data of panel 302 converted to the distance from wireless tag reader 105 to wireless tag 103. However, since the phase angle between the transmitted and reflected signal will rotate 2π radians for every wavelength, it may not be possible to calculate the absolute distance from wireless tag reader 105 to wireless tag 103. In some implementations, executable code 140 may connect disconnected segments of graph data back together, as shown in panel 304. To stitch the disconnected segments of the graph shown in panel 303 together, executable code 140 may align the slope of the trailing points of one group with the slope of the leading points of the next group. Panel 304 shows the graph data from box 313 realigned accordingly.

Working in conjunction with wireless tag reader 103, system 100 may use location detection device 107 to follow the location of individuals with in its frame of view. By computing the distance between each individual and the wireless tag reader 105, as measured by location determination device 107, it may be possible to correlate the physical path of the individual to the synthetic aperture radar (SAR) path of wireless tag 103. It should be noted that due to phase wrapping, there is an equivalent distance wrapping, and it may not be possible for executable code 140 to determine the absolute distance from wireless tag 103 to wireless tab reader 105. Thus, for a given time window, both the distance determined using wireless tag reader 105 and the distance determined using location determination device 107 may start at zero. The final result is shown in panel 305, which shows the correlation between the distance determined using wireless tag reader 105 and the distance determined using location determination device 107.

In some implementations, when multiple individuals walk around, executable code 140 may determine multiple motion paths using wireless tag reader 105 and multiple motion paths using location determination device 107. By taking the standard error between the sets of paths, executable code 140 may determine which path belongs to which individual.

Figure 4:
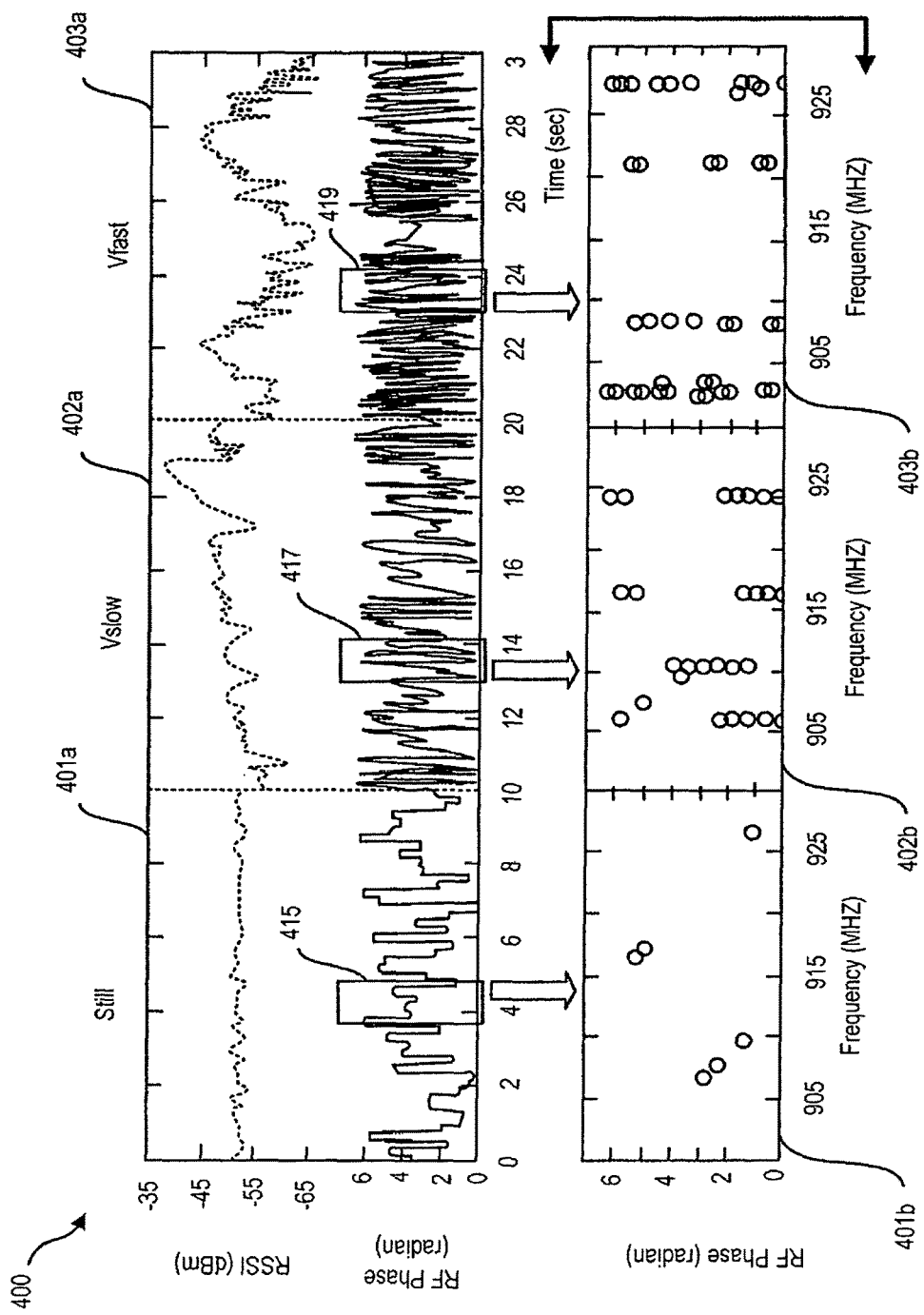
FIG. 4 shows a diagram of data collected for distinguishing members in a group using the system of FIG. 1, according to one implementation of the present disclosure.

FIG. 4 shows a diagram of data collected for distinguishing members in a group using the system of FIG. 1, according to one implementation of the present disclosure. Diagram 400 depicts a thirty-second trace of RSSI and RF Phase plot of wireless tag 103 showing the distribution of the radial phase feature depending on the movement of the wireless tag worn by an individual. In addition to the synthetic aperture approach described in relation to FIG. 3, it may be possible to use low-level channel parameters along with machine learning techniques to determine the correlation between individuals within the field of view of location determination device 107 and wireless tags within the range of the wireless tag reader 105. Each time wireless tag reader 105 interrogates wireless tag 103, wireless tag reader 105 may report channel parameters, such as RSSI, RF Phase, and Doppler shift (along with the channel number) which represent a unique signature of the RF environment of wireless tag 103. By observing the change in these channel parameters over time, and the magnitude of change, system 100 may correlate the motion signature of wireless tag 103 with the motion of individual 101.

FIG. 4 shows that during the first ten (10) seconds, corresponding to panels 401a and 401b, wireless tag 103 is held still. Next, wireless tag 103 is waved at a slow speed for ten (10) seconds, corresponding to panels 402a and 402b, and then at a faster rate for ten (10) seconds, corresponding to panels 403a and 403b. The still state of wireless tag 103 may be distinguished from the motion or motive states by observing the RSSI signals shown in panel A of FIG. 4, by noting the motion at higher velocities results in larger RSSI and phase variations.

It should be noted that the FCC regulations require RFID readers in the 915 MHz ISM band to pseudo-randomly change their transmit frequency in order to minimize interference with other devices. To satisfy this requirement, RFID readers frequency hop across 50 channels from 902 MHz to 928 MHz (in the USA) at a time interval of approximately 0.2 seconds. Frequency hopping results in discontinuities in phase data as a function of time. To better reveal the underlying characteristics of phase hidden by frequency hopping, panels 401b, 402b, and 403b show data from three 1-second slices of phase from the three different states, corresponding to segments 415, 417, and 419, respectively, re-plotted against channel frequency. For still states of wireless tag 103, phase is linearly correlated with the channel number resulting in lines with constant slope, that wrap between 0 and 2π, as shown in panel 401b. Motive states of wireless tag 103 result in increased phase variation within each channel, which is positively correlated with the intensity of motion, as shown in panels 402b and 403b. In some implementations, executable code 140 may use RF channel parameters including phase, RSSI and read rate to classify states of tags into still states and motion states to correlate motion of wireless tag 103 to the motion of individual 101 as measured by location determination device 107.

Phase Features

In some implementations, executable code 140 may calculate RF movement features, based on phase, which can be correlated to a wireless tag velocity. Using equation 2 below, executable code 140 may be able to calculate the velocity of a wireless tag for consecutive reads on the same channel.

$$v_r = \frac{\lambda(\theta_1 - \theta_2)}{4\pi(t_1 - t_2)} \quad (2)$$

Executable code 140 may calculate an RFID Radial Velocity, ((position(end)−position(1))/t, which is the radial position change accumulated across all channels divided by sum of time intervals of all channels, position trace is observed using a SAR technique; an absolute RFID velocity, $\Sigma_{i=1}^{H}$(|position$_{i+1}$−positoin$_i$|)/t, which is the absolute position change divided by time difference; a standard error of the simple linear regression of phase versus channel frequencies, stderror(linear fit(channel, phase)), and a frequency phase derivative, which is a phase change divided by frequency change when carrier signal frequency changes (phase(i+1) phase(i))/(frequency(i+1)−frequency(i)).

RSSI Features

Given the RSSI characteristics observed in FIG. 4, change of distance will create variations in RSSI signal which executable code 140 may calculate using an average of RSSI standard deviation within each channel, an average of RSSI difference between consecutive samples within each channel, and an absolute value of RSSI.

Read Rate

The read rate of wireless tag 103, which is the number of packets wireless tag reader 205 receives from each wireless tag per second, may be primarily correlated to the amount of RF power wireless tag 103 can receive. This may indicate that wireless tags with a low read-rate are on the edge of the read zone, which is well outside the field of view of location determination device 107. Thus, the read-rate feature may be employed to exclude tags that are unlikely to be a viable candidate for matching wireless tag 103 with individual 101.

Location Detection Features

Both RSSI and phase are sensitive to movement in the radial direction to the reader. Thus, the position of individuals reported by location detection device 107 may be transformed from location detection device's 107 Cartesian coordinate system to a polar coordinate system centered at the location of detection device 107. Once the individuals are in the correct reference frame, executable code 140 may extract a radial component of the wireless tag's velocity relative to the RFID reader antenna, a non-radial component of the wireless tag's velocity relative to the RFID reader antenna, and a distance between each wireless tag and wireless tag reader 105.

Figure 5:
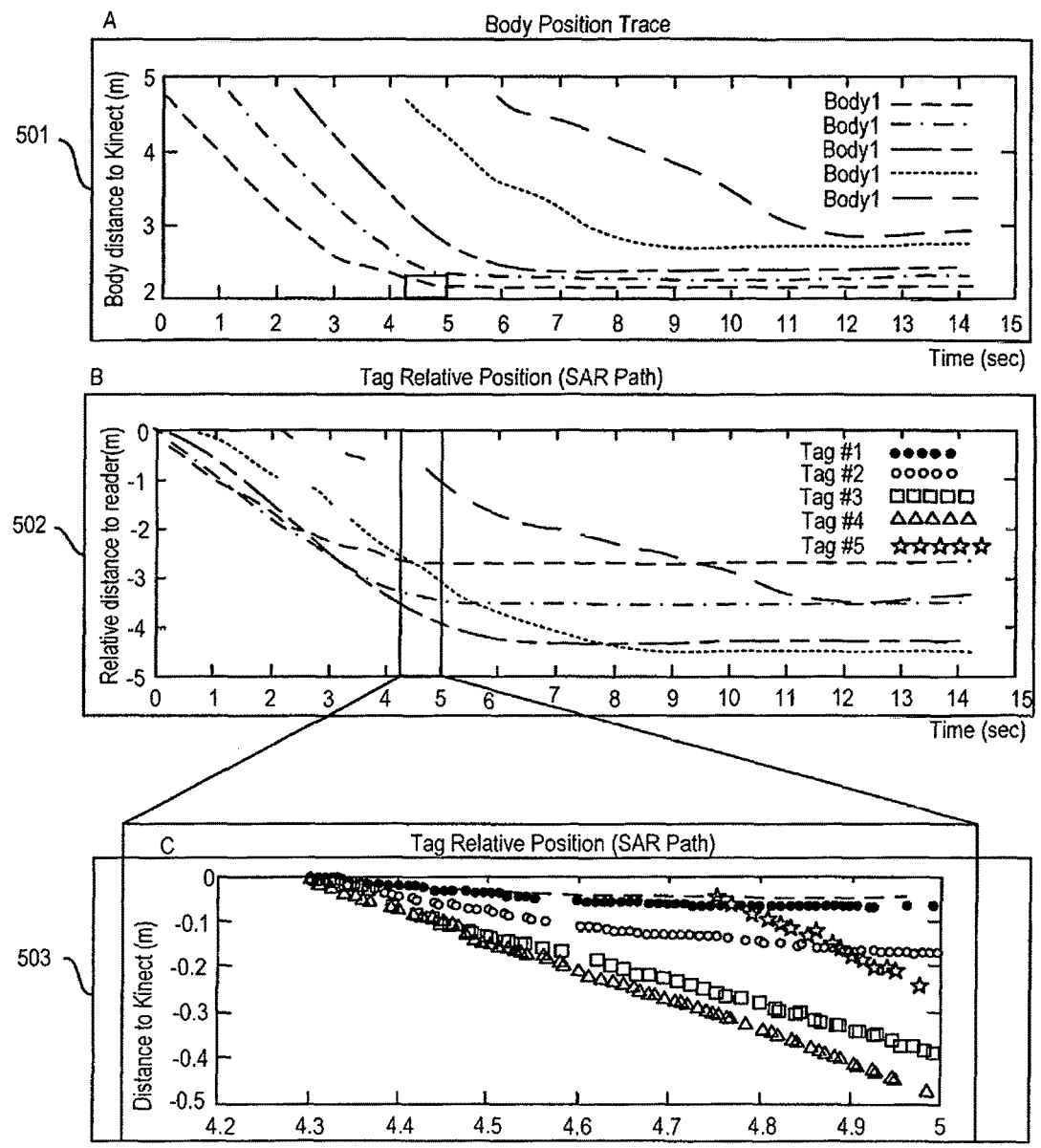
FIG. 5 shows a diagram of data collected for distinguishing members in a group using the system of FIG. 1, according to one implementation of the present disclosure.

FIG. 5 shows a diagram of data collected for distinguishing members in a group using the system of FIG. 1, according to one implementation of the present disclosure. Panel 501 shows the distance traces for five (5) individuals (i.e. Bodies 1-5) walking around, as measured by location detection device 107. Panel 502 shows the relative distance of the wireless tags corresponding to the five individuals as the individuals walk around. Since wireless tag reader 105 may detect the wireless tags at a range of about seven to eight meters, the wireless tags may be readable before location detection device 107 can follow them, which may occur when the individuals are within about 4.8 meters of location detection device 107.

In one implementation, executable code 140 may associate wireless tag IDs to individuals in real-time by applying a ⅔ second sliding window, which is advanced every ⅓ seconds, to the incoming data stream from wireless tag reader 105 and location determination device 107. During each time segment, executable code 140 may analyze the buffered data and apply the SAR and SVM techniques. In the case of the SAR approach, the standard error between each of the five SAR tag traces is computed across each of the five-body position traces. An example can be seen in panel 503, which shows an expanded view of a ⅔ second time slice from panels 501 and 502. Here, it can be seen that Body 1 is the best fit for Tag 1, which will result in the lowest standard error and highest confidence. Thus, every ⅓ seconds, the system outputs new binary matching events and places them in a results buffer for each body. It should be noted that SAR data may only be considered valid when compared to individuals that are in motion, due to the 2π wrapping of phase. During the same time window, eight RF features for the five RFID tags and three Kinect™ features for the five individuals are passed to a trained support vector machine classifier, which generates a probability estimation of each Tag and Body pair. For each individual body, if a given RFID tag has a probability with a margin of, for example, 30% or more when compared to all the other RFID tags, it is considered a matching event and the result is placed in the result buffer.

In such an implementation, each of the five individuals may be assigned a results buffers including the last ten (10) prediction points from the SAR and SVM predictor. Once the results buffer is full, the arithmetic mode is taken as the final matching result, and the ID is formally assigned to the body or individual. Since the prediction for each body individual by the system can be updated over time, misidentifications can be corrected. Once there is sufficient confidence, the identity of the individual (i.e. tag/body pair) may be locked in.

Figure 6:
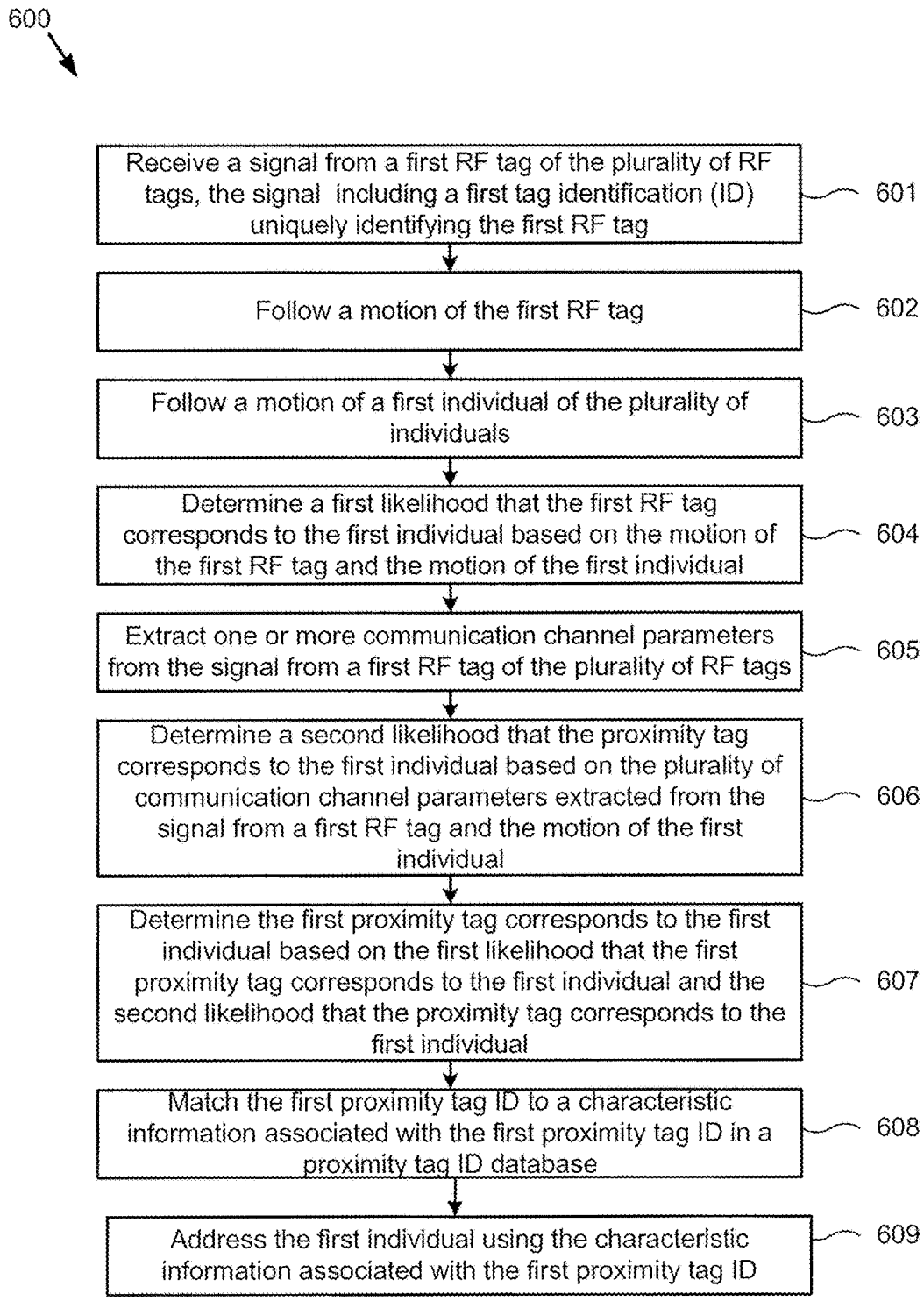
FIG. 6 shows a flowchart illustrating an exemplary method of distinguishing members in a group using tags, according to one implementation of the present disclosure.

FIG. 6 shows a flowchart illustrating an exemplary method of distinguishing members in a group using tags, according to one implementation of the present disclosure. Method 600 begins at 601, where executable code 140 receives a signal from a first RF tag of a plurality of RF tags, the signal including a first tag identification (ID) uniquely identifying the first RF tag. In some implementations, wireless tag reader 105 may be capable of reporting channel parameters such as Received Signal Strength Indicator (RSSI), RF phase, and Doppler shift, as well as the unique wireless ID of each wireless tag. In some implementations, wireless tag reader 105 may interrogate a plurality of wireless tags within its range, for example, according to the ISO-18000-6C specification, based on the Slotted Aloha protocol.

At 602, executable code 140 follows a motion of the first RF tag. In some implementations, wireless tag processing module 141 may use a reverse synthetic aperture method to follow the motion of the first RF tag. Wireless tag reader 105 may be stationary while individual 101 is in motion, creating the synthetic aperture to follow the motion of individual 101. In other implementations, wireless tag reader 105 may be in motion, and wireless tag processing module 141 may take the motion of wireless tag reader 105 into consideration when following the motion of the first RF tag.

At 603, executable code 140 follows a motion of a first individual of the plurality of individuals. Executable code may use location detection device 107 to follow the motion of one or more individuals using a camera, a LIDAR device, or other light based observation device. By using a light based device, location detection module 143 may detect, determine, and/or follow the position of each individual with a greater accuracy than may be achieved using an RF device. In some implementations, location detection module 143, using location detection device 107, may follow the motion of the first individual in 3D space.

At 604, executable code 140 determines a first likelihood that the first RF tag corresponds to the first individual based on the motion of the first RF tag and the motion of the first individual. In some implementations, identification module 145 may compare the motion of the first RF tag with the motion of the first individual. Based on the similarity in the motion of the first RF tag and the motion of the first individual, identification module 145 may determine a likelihood that the first person corresponds to the first RF tag, such as when the first person is wearing the first RF tag. The first likelihood may be a percentage, such as a 60% likelihood that the first RF tag corresponds to the first person, a 65% likelihood, etc.

At 605, executable code 140 extracts one or more communication channel parameters from the signal from a first RF tag of the plurality of RF tags. In some implementations, wireless tag monitoring module 141 may extract channel parameters such as Received Signal Strength Indicator (RSSI), RF phase, and Doppler shift from the signal from the first RF tag. Wireless tag processing module 141 may distinguish between motive states by detecting larger RSSI and Phase variations, indicating motion at higher velocity of wireless tag 103. In some implementations, wireless tag processing module 141 may follow the motion of the first RF tag by monitoring the channel parameters of the first ID tag.

For example, using the RSSI, RF phase, and/or Doppler shift of the signal from the first RF tag, wireless tag processing module 141 may determine that the first RF tag is in motion and a direction of the motion relative to wireless tag reader 105. Wireless tag processing module 141 may determine a duration of the motion of the first RF tag, based on the received signal. In some implementations, wireless tag processing module 141 may determine, follow, and/or monitor the motion and/or velocity of the first RF tag based on the channel parameters of the signal.

At 606, executable code 140 determines a second likelihood that the wireless tag corresponds to the first individual based on the plurality of communication channel parameters extracted from the signal from a first RF tag and the motion of the first individual. In some implementations, wireless tag processing module 141 may determine a motion of the first RF tag based on one or more of the parameters extracted from the signal form the first RF tag. For example, a change in the RSSI, RF phase, and/or a Doppler shift may indicate the first RF tag is in motion, and wireless tag processing module 141 may determine a direction of the detected motion. Identification module 145 may compare the motion based on the extracted parameters with the motion of the first individual determined by location detection module 143. Identification module 145 may determine a second likelihood that the wireless tag corresponds to the first individual. The second likelihood may be a percentage, such as a 60% likelihood that the first RF tag corresponds to the first person, a 65% likelihood, etc.

At 607, executable code 140 determines the first wireless tag corresponds to the first individual based on the first likelihood that the first wireless tag corresponds to the first individual and the second likelihood that the wireless tag corresponds to the first individual. In some implementations, identification module 145 may compare the first likelihood that the wireless tag corresponds to the first individual with the second likelihood that the wireless tag corresponds to the first individual. Based on the comparison, identification module 145 may determine that the wireless tag does correspond to the first individual. For example, when the first likelihood indicates a high probability that the wireless tag corresponds to the first individual, such as a 50% or greater likelihood, and the second likelihood indicates a high likelihood that the wireless tag corresponds to the first individual, such as a 50% or greater likelihood, identification module 145 may determine that the wireless tag corresponds to the first individual.

At 608, executable code 140 matches the first wireless tag ID to characteristic information associated with the first wireless tag ID in a wireless tag ID database. In some implementations, wireless tag reader 105 may be capable of reporting a unique wireless tag ID of wireless tag 103. In some implementations, identification module 145 may compare the wireless tag ID with wireless tag ID database 135 to identify characteristic information associated with the wireless tag ID of wireless tag 103. Method 600 continues at 609, where executable code 140 addresses the first individual using the name associated with the first wireless tag ID. For example, system 100 may be a part of a robot at an amusement park where guests may carry a wireless tag, such as wireless tag 103, with them around the park. When the guest encounters the robot, the robot may address the guest by name or nickname, based on the characteristic information including the name of the guest being associated with the wireless tag ID in wireless tag ID database 135. Addressing individual 101 may include displaying an individualized text message on a display addressed to or otherwise using the characteristic information associated with wireless tag 103 in wireless tag database 135, playing an audio message on a speaker addressed to individual 101, etc.

From the above description, it is manifest that various techniques can be used for implementing the concepts described in the present application without departing from the scope of those concepts. Moreover, while the concepts have been described with specific reference to certain implementations, an individual having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system for use with a plurality of radio frequency (RF) tags each being carried by one of a plurality of individuals, the system comprising:
   a non-transitory memory storing an executable code;
   a hardware processor executing the executable code to:
      receive a signal via a wireless communication channel from a first RF tag of the plurality of RF tags, the signal including a first tag identification (ID) uniquely identifying the first RF tag;
      follow a motion of the first RF tag using the signal;
      follow a motion of a first individual of the plurality of individuals;
      determine a first likelihood that the first RF tag is being carried by the first individual based on the motion of the first RF tag and the motion of the first individual;
      measure, using the signal received from the first RF tag via the wireless communication channel, one or more communication channel parameters associated with the wireless communication channel; and
      determine a second likelihood that the first RF tag corresponds to the first individual based on the one or more communication channel parameters and the motion of the first individual.

2. The system of claim 1, wherein the hardware processor further executes the executable code to:
   determine the first RF tag corresponds to the first individual based on the first likelihood that the first RF tag corresponds to the first individual and the second likelihood that the first RF tag corresponds to the first individual.

3. The system of claim 1 wherein the one or more communication channel parameters include at least one of a received signal strength indicator (RSSI) of the signal, an RF phase of the signal, a Doppler shift of the signal, and a read rate of the signal.

4. The system of claim 1, wherein the hardware processor further executes the executable code to:
   match the first RF tag ID to a characteristic information associated with the first RF tag ID in an RF tag ID database; and
   address the first individual using the characteristic information associated with the first RF tag ID.

5. The system of claim 1, further comprising an RF antenna following the motion of the first RF tag.

6. The system of claim 5, wherein the RF antenna is one of stationary and in motion.

7. The system of claim 1, further comprising a location detection device following the motion of the first individual, and wherein the location detection device uses one of a stereo camera, a 3D depth camera, a structured light and a LIDAR device.

8. The system of claim 7, wherein the location detection device is one of stationary and in motion.

9. The system of claim 1, wherein the motion of the first RF tag is followed using a reverse synthetic aperture.

10. A method for use with a system including a non-transitory memory and a hardware processor, the method comprising:
receiving, using the hardware processor, a signal via a wireless communication channel from a first RF tag of the plurality of RF tags each being carried by one of a plurality of individuals, the signal including a first tag identification (ID) uniquely identifying the first RF tag;
following, using the hardware processor, a motion of the first RF tag using the signal;
following, using the hardware processor, a motion of a first individual of the plurality of individuals;
determining, using the hardware processor, a first likelihood that the first RF tag is being carried by the first individual based on the motion of the first RF tag and the motion of the first individual;
measuring, using the hardware processor and the signal received from the first RF tag via the wireless communication channel, one or more communication channel parameters associated with the wireless communication channel; and
determining, using the hardware processor, a second likelihood that the first RF tag corresponds to the first individual based on the one or more communication channel parameters and the motion of the first individual.

11. The method of claim 10, further comprising
determining, using the hardware processor, the first RF tag corresponds to the first individual based on the first likelihood that the first RF tag corresponds to the first individual and the second likelihood that the first RF tag corresponds to the first individual.

12. The method of claim 10, wherein the one or more communication channel parameters include at least one of a received signal strength indicator (RSSI) of the signal, an RF phase of the signal, a Doppler shift of the signal, and a read rate of the signal.

13. The method of claim 10, further comprising:
matching, using the hardware processor, the first RF tag ID to a characteristic information associated with the first RF tag ID in an RF tag ID database; and
addressing, using the hardware processor, the first individual using the characteristic information associated with the first RF tag ID.

14. The method of claim 10, wherein the first RF tag is worn by the first individual.

15. The method of claim 10, wherein the system further comprises a location detection device following the motion of the first individual, and wherein the location detection device uses one of a stereo camera, a 3D depth camera, a structured light and a LIDAR device.

16. The method of claim 15, wherein the location detection device is one of stationary and in motion.

17. A system for use with a plurality of tags each being carried by one of a plurality of individuals, the system comprising
a non-transitory memory storing an executable code;
a hardware processor executing the executable code to:
receive a signal associated with a first tag of the plurality of tags via a wireless communication channel, the signal including a first tag identification (ID) uniquely identifying the first tag;
follow a motion of the first tag using the signal;
follow a motion of a first individual of the plurality of individuals;
determine a first likelihood that the first tag is being carried by the first individual based on the motion of the first tag and the motion of the first individual;
measure, using the signal received from the first tag via the wireless communication channel, one or more communication channel parameters associated with the wireless communication channel; and
determine a second likelihood that the first tag corresponds to the first individual based on the one or more communication channel parameters and the motion of the first individual.

18. The system of claim 1, wherein the first RF tag is worn by the first individual.

19. The system of claim 1, wherein the one or more communication channel parameters include at least one of an RF phase of the signal, a Doppler shift of the signal, and a read rate of the signal.

20. The method of claim 10, wherein the one or more communication channel parameters include at least one of an RF phase of the signal, a Doppler shift of the signal, and a read rate of the signal.

* * * * *